(12) United States Patent
Buch et al.

(10) Patent No.: US 7,979,699 B2
(45) Date of Patent: Jul. 12, 2011

(54) PROCESSING CAPACITY ON DEMAND

(75) Inventors: Deep K. Buch, Folsom, CA (US);
Shivnandan Kaushik, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 745 days.

(21) Appl. No.: 10/848,387

(22) Filed: May 19, 2004

(65) Prior Publication Data
US 2005/0273601 A1 Dec. 8, 2005

(51) Int. Cl.
*H04L 29/06* (2006.01)

(52) U.S. Cl. .................................. 713/161; 726/6

(58) Field of Classification Search .................. 713/161; 726/2, 21; 712/28
See application file for complete search history.

(56) References Cited

U.S. PATENT DOCUMENTS

| | | | | |
|---|---|---|---|---|
| 5,742,759 | A * | 4/1998 | Nessett et al. | 726/4 |
| 5,884,089 | A * | 3/1999 | Orian et al. | 712/1 |
| 7,130,986 | B2 * | 10/2006 | Mehta et al. | 712/27 |
| 2001/0025312 | A1 | 9/2001 | Obata | |
| 2004/0199632 | A1 * | 10/2004 | Romero et al. | 709/226 |
| 2005/0091473 | A1 * | 4/2005 | Aguilar et al. | 712/28 |

OTHER PUBLICATIONS

Hyde, J. "How to make Pentium Pros Cooperate," vol. 21, No. 4.*
Hyde, J., "How to Make Pentium Pros Cooperate" Byte, McGraw-Hill Inc., St. Peterborough, US., vol. 21, No. 4 (Apr. 1996).
Parulkar, I., et al., A Scalable, Low Cost Design-for-Test Architecture for UltraSPARC™ Chip Multi-Processors, Proceedings International Test Conference 2002, ITC 2002, Baltimore, MD, Oct. 7-10, 2002, International Test Conference, New York, NY; IEEE, US, Oct. 7, 2002, pp. 726-735.
"Capacity Upgrade on Demand, Installing and Upgrading Processors," Mar. 2001, pp. I-VIII, 1-26 URL:http://publib16.boulder.ibm.com/pseries/en_US/infocenter/base/hardware_docs/pdf/380583.pdf>, Retrieved from Internet on Aug. 23, 2005.
"IBM eserver iSeries—Versatile, Multi-Environment Servers for the Era of e-business on demand™" IBM Hardware Announcement, IBM, US, Jan. 24, 2003, pp. 7-8.
"Intel Celeron Processor Specification Update," Sep. 2002, pp. I-V, 1-88 URL:http://web.archive.org/web/20030429211147/http://developer.intel.com/design/celeron/specupdt/24374847.pdf>
Retrieved from Internet Dec. 8, 2005.
The International Search Report mailed Dec. 28, 2005.

* cited by examiner

*Primary Examiner* — Kambiz Zand
*Assistant Examiner* — Dant B Shaifer Harriman
(74) *Attorney, Agent, or Firm* — Kenyon & Kenyon LLP

(57) ABSTRACT

Embodiments of the present invention relate to a system and method for providing processing capacity on demand. According to the embodiments, a processor package has a plurality of processing elements. One or more of the processing elements may be made active in response to increased demand for processing capacity based on modifiable authorization information.

9 Claims, 7 Drawing Sheets

PROCESSING CAPACITY ON DEMAND

BACKGROUND

The term "capacity on demand" as it relates to computer systems refers generally to adding resources on an as-needed basis. In particular, processing capacity could be added on demand.

Known arrangements for adding processing capacity on demand involve providing latent processing capacity that is unused until a need for extra capacity arises. When a need arises, the latent processing capacity may be tapped, and then allowed to again become unused when the need passes. For example, latent processing capacity could be added to a high-end server in a data network such as the Internet, and called upon only during periods of peak traffic. Letting the processing capacity be unused until needed reduces costs, since agreements may be made with capacity providers that only capacity that is actually used will be paid for.

In some known arrangements, latent or reserve processing capacity may be provided in processor packages that are added to a system's hardware platform. The processor packages may be brought into use at a platform level, in a manner analogous to using a relay to connect power to a circuit to bring the circuit into use. When reserve capacity is used in this way, it involves adding the capacity in bulk form, that is, in units of one or more entire processor packages. Finer granularity is not possible, in that individual processing elements on a processor package cannot be selectively brought into use. Such an approach may be wasteful if all processing elements on a processor package are not needed.

Other known arrangements may be able to selectively activate individual processing elements on a processor package for added capacity. Such arrangements may use a form of power management to regulate how many processing elements are active. In this power management approach, processing elements not in use may be placed into a low power state to conserve energy, and then placed into a higher power state when put into use. Additionally, known power management techniques typically require that managed devices be made continuously "visible" (in an understood operating system software sense) to associated BIOS (Basic Input/Output System) and operating system software.

DETAILED DESCRIPTION

One embodiment of the present invention relates to performing a process to check authorization information corresponding to available reserve processing capacity to determine if the reserve processing capacity is authorized for use, and if the authorization information indicates that the reserve processing capacity is authorized for use, using the reserve processing capacity. The check may be inserted in a non-intrusive way into standard firmware initialization routines, making implementation comparatively inexpensive. Moreover, the reserve processing capacity need not be made continuously visible to an operating system, reducing security concerns.

In embodiments, the reserve processing capacity may be processing elements on a processor package, and the authorization information may be contained in a data storage area on the processor package. The data storage area could be, for example, a register to store an authorization status for each processing element. Based on a respective status for each processing element, the processing elements may be brought into use selectively and individually.

Figure 1:
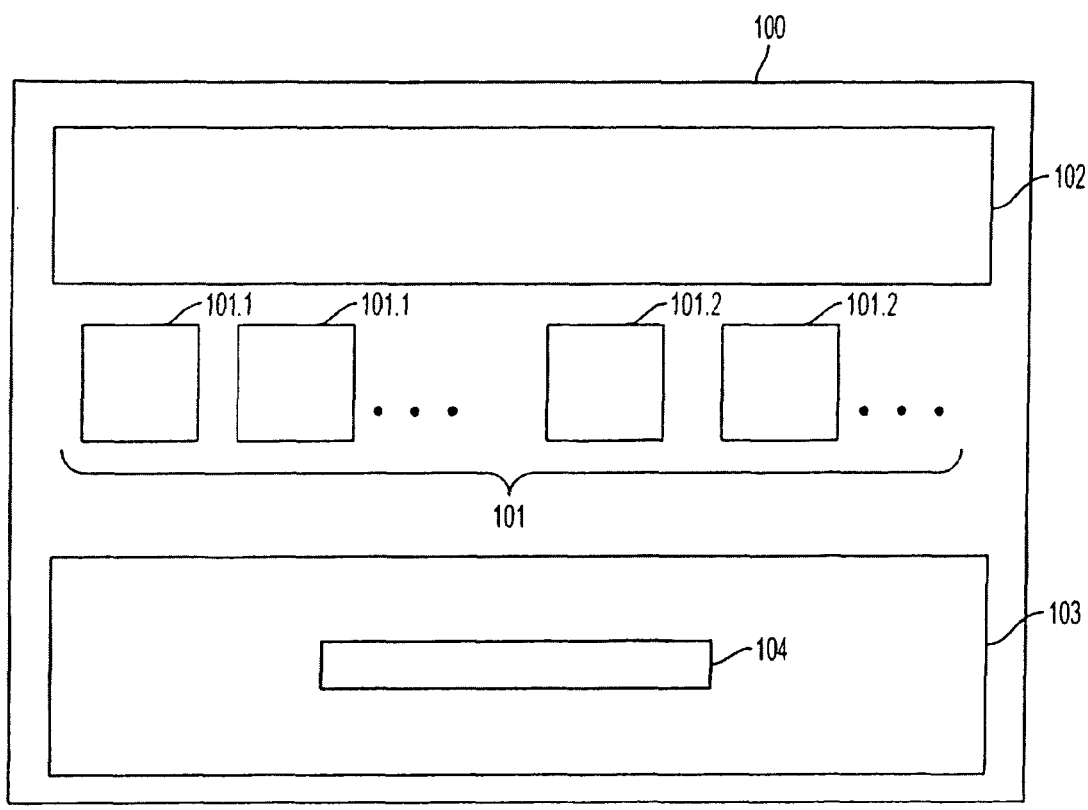
FIG. 1 shows a processor package according to embodiments of the present invention.

FIG. 1 shows an example of a processor package 100 according to embodiments of the present invention. The processor package 100 may comprise a plurality of processing elements 101. One or more of the processing elements 101 may be reserve processing elements 101.1 that are not used unless there is a demand for increased capacity, while others of the processing elements may be regularly-used processing elements 101.2. As is typical for many known processor packages, the processor package 100 may further include a cache 102 and a region 103 distinct from the processing elements containing, for example, bus interface logic. According to embodiments of the present invention, the region 103 may further include a storage area for authorization information 104. The storage area 104 could be implemented, for example, as a register having a bit corresponding to each processing element. A status of each bit could indicate whether a corresponding processing element was authorized for use. For example, a bit with a logic value of "1" could indicate that a corresponding processing element was authorized for use, while a bit with a logic value of "0" could indicate that a corresponding processing element was not authorized for use. Based on the authorization information in the register 104, reserve processing elements may be activated for use on demand to add to the processing capacity provided by the regular-use processing elements.

The authorization information could be set by any of a number of secure mechanisms. For example, many high-end server platforms include a service controller that can be coupled to platform components and used to program the components. Such a service controller could, for example, be used by an authorized person to set bits in the register 104 to activate one or more of the reserve processing elements during a period of increased demand. Or, for example, the bits could be automatically set by secure software based on certain triggering events, such as a demand threshold being met or exceeded.

A processor package 100 shipped by a vendor to a user could have a set of regular processing elements that would ordinarily be active, and a set of reserve processing elements that would be inactive unless called on by increased demand for processing capacity. There could be an agreement between the vendor and the user wherein, for example, the user could selectively activate reserve processing elements and make a corresponding per-use payment to the vendor. In one embodiment, the processing elements are processor cores and the processor is a multi-core processor.

Figure 2:
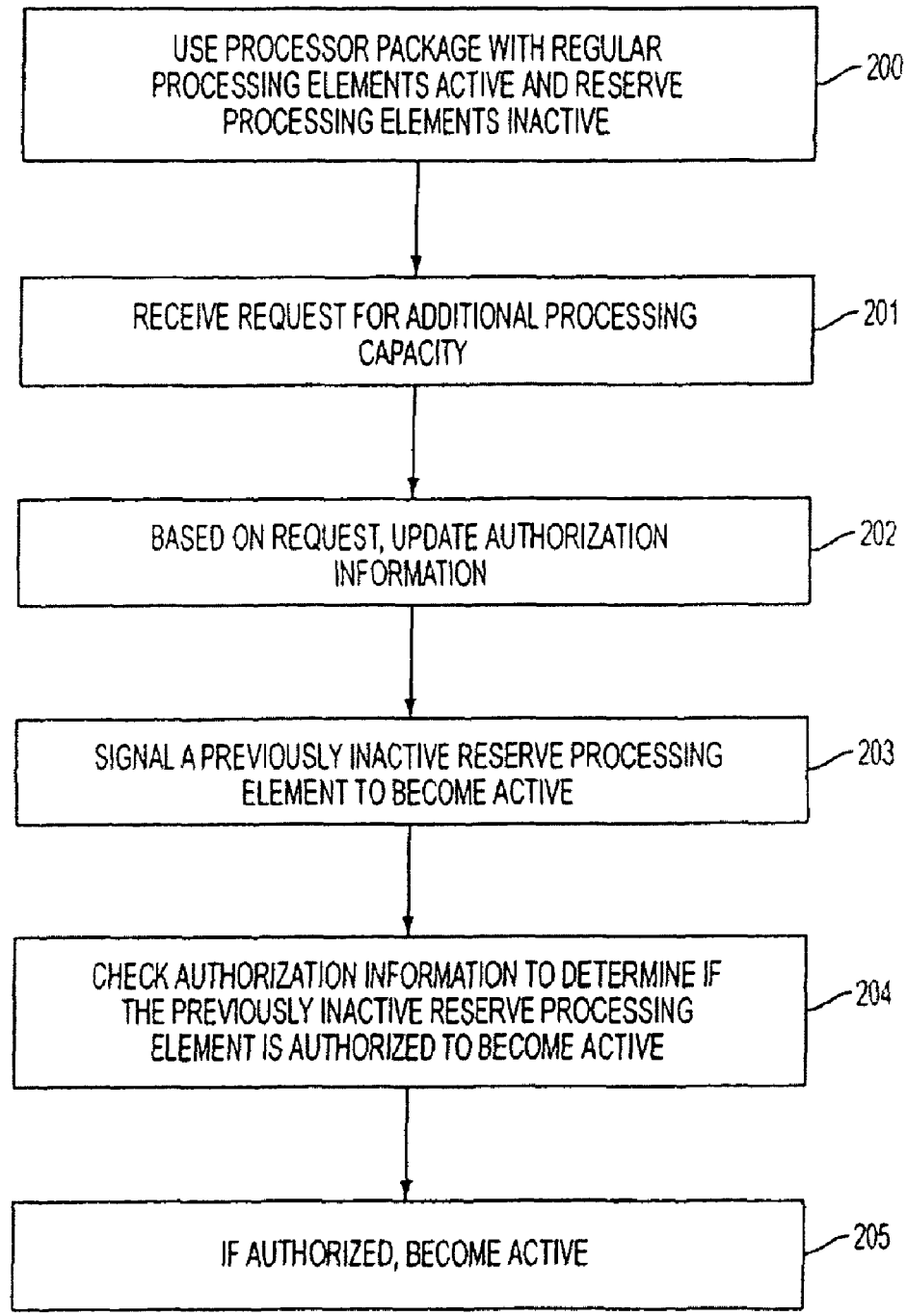
FIGS. 2-4, 4A and 5 show process flows according to embodiments of the present invention.

FIG. 2 shows a process flow according to embodiments of the present invention for adding reserve processing elements to the processing capacity of a processor package 100. As shown in block 200, the processor package could be placed into use with the regular processing elements active and the reserve processing elements initially inactive.

Then, a need for increased processing capacity could arise in the user's system. For example, the processor package could have been placed into use in a server system in a data network that began to experience increased traffic. Accordingly, the system could receive a request for additional processing capacity, as shown in block 201.

Based on the request for additional capacity, the authorization information for the inactive processing elements could be updated, as shown in block 202. This could be performed by a secure operation as described above. The secure operation could cause one or more bits in a register 104 of the processing package to be set to the appropriate logic value.

One or more of the previously inactive processing elements could then be signaled to become active, as shown in block 203. If signaled to become active, a previously inactive processing element may check the authorization information to determine if it is authorized to become active, as shown in block 204. If authorized to become active, the previously inactive processing element may become active, as shown in block 205. Becoming active may involve executing initialization processes, including known BIOS (Basic I/O System) routines, to become ready to come "online" for use. When the previously inactive processing element is ready to come online, an operating system of whatever hardware platform the previously inactive processing element is installed on may be notified of the availability of the previously inactive processing element and begin to use it.

Figure 3:
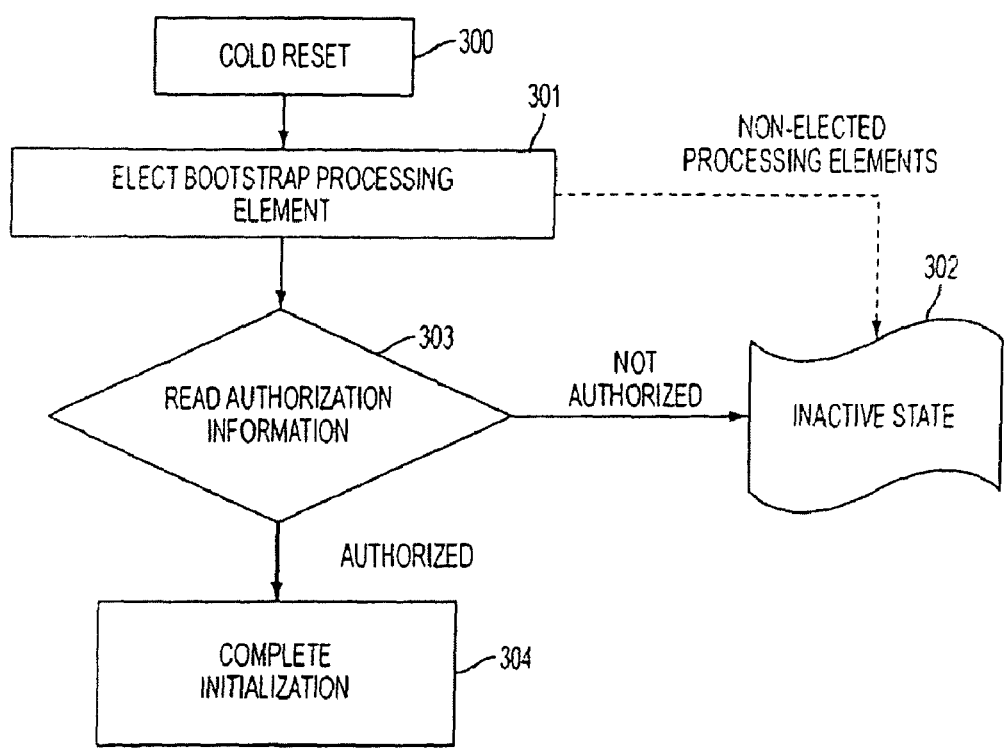

Operations associated with reaching the state illustrated by block 200, above, may involve initialization operations. One such initialization operation is sometimes termed a "cold reset" and involves an initial power-up of a hardware device. In known systems, following a cold reset, a plurality of processing elements on a processor package may elect a single bootstrap processing element by a known election process. The bootstrap processing element is responsible for executing bootstrap routines and bringing the non-bootstrap processing elements online. FIG. 3 shows a process associated with a cold reset according to embodiments of the present invention. Following a cold reset as shown in block 300, a plurality of processing elements may elect a bootstrap processing element as shown in block 301.

The non-elected processing elements may enter an inactive state, as shown in block 302. Known processing systems may include firmware to create such an inactive state. The firmware, for example, may be stored in read-only memory (ROM) and be specific to a particular processor architecture. The firmware may also be referred to as "micro-code" or "micro-instructions" and may be contained on the processor in hard coded or other format in some embodiments. In some embodiments, the inactive state may be a "Wait_for_SIPI" (Wait_for_Startup Inter-Processor Interrupt) state as known in Intel® x86 processor architecture. As shown in block 303, as part of the execution of firmware according to embodiments of the present invention pursuant to a cold reset, the bootstrap processing element may then read authorization information in register 104. The firmware could be, for example, firmware of the Intel® x86 processor architecture. If the authorization information indicates that the bootstrap processor is authorized for use, the bootstrap processing element may proceed with the rest of its initialization, as shown in block 304. Otherwise, the bootstrap processor may enter an inactive state along with the rest of the processing elements. In the latter situation, the entire processor package would be inactive.

Figure 4:
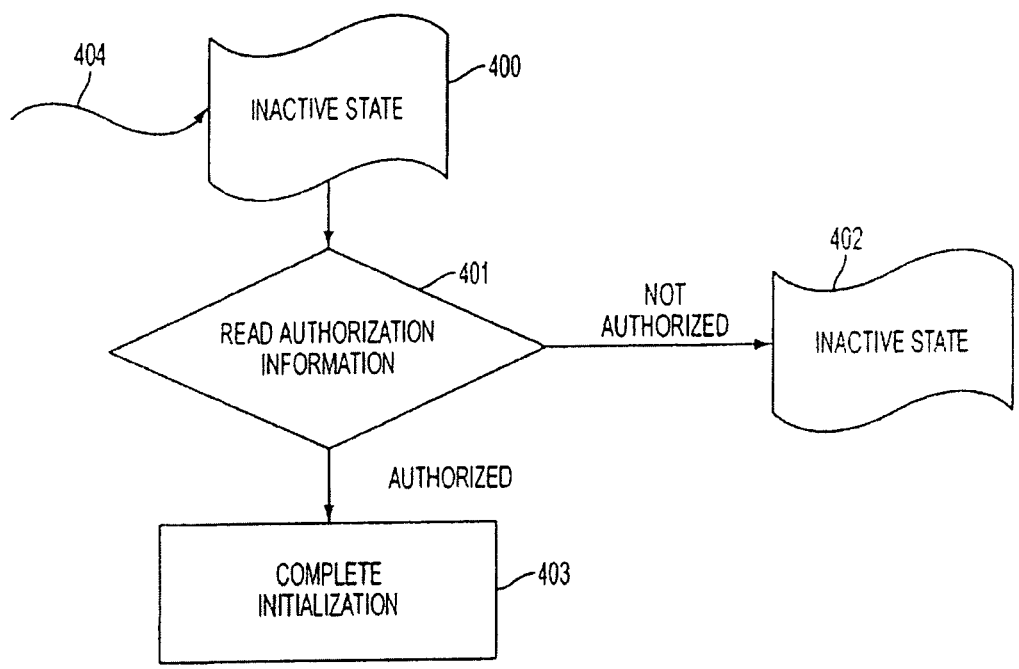

More typically, however, there may be a set of processing elements authorized for regular use in the authorization information. After the bootstrap processing element of this regular-use set was initialized, the bootstrap processing element might begin to bring others of the regular-use processing elements into use. A process for this according to embodiments of the present invention is shown in FIG. 4. As shown in block 400, processing element k of N total processing elements on a processor package may be inactive. In embodiments, this inactive state may be a Wait_for_SIPI state that may have been entered following a cold reset, as illustrated by the flow of blocks 300-302 (see FIG. 3) discussed above.

The bootstrap processing element might then issue a signal 404 to processing element k to cause it to leave the inactive state. In embodiments, the signal 404 may be a "Startup Inter-Processor Interrupt" (SIPI) of the known Intel® x86 processor architecture. A SIPI signal may cause a processing element in the Wait_for_SIPI state to leave or "wake up" from the Wait_for_SIPI state. The SIPI could cause processing element k to leave the inactive state and check the authorization information, as shown in block 401. If authorized, processing element k may proceed to complete its initialization, as shown in block 403. Otherwise, processing element k may return to an inactive state, as shown in block 402.

Following a cold reset, the process of FIG. 4 could be performed for each of the N processing elements. The authorization information would determine which of the N processing elements was brought into use. As noted earlier, there could be a regular-use set of processing elements designated in the authorization information, and a set of reserve processing elements designated in the authorization information.

Figure 4A:
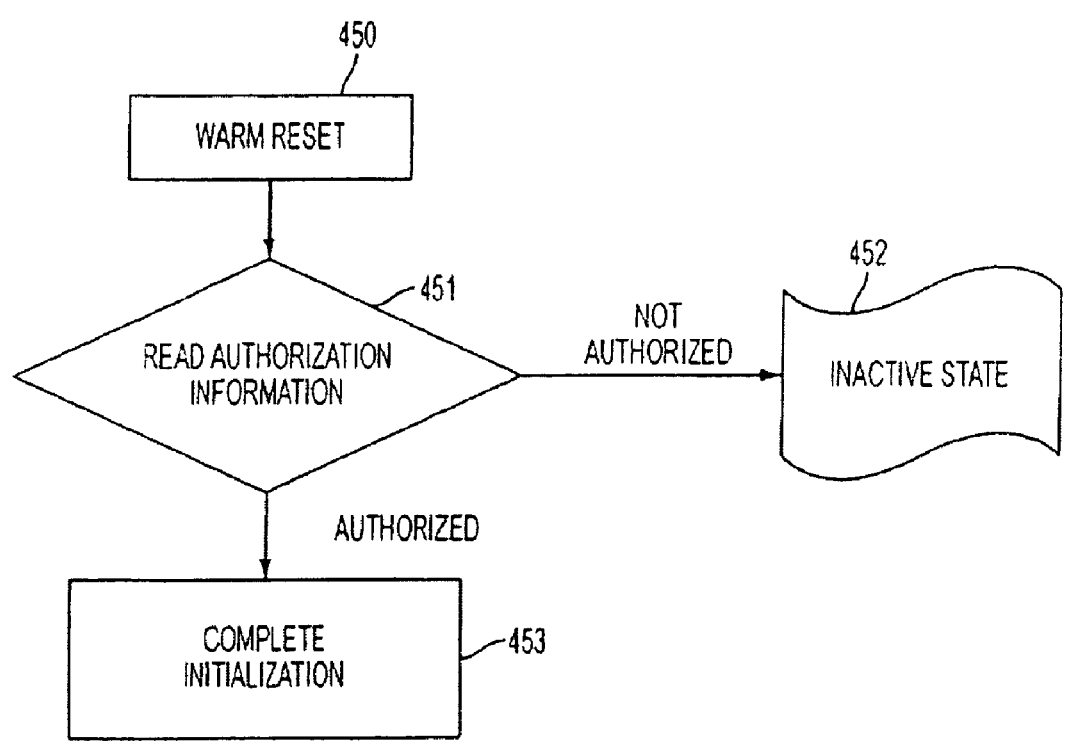

According to embodiments of the present invention, a check of the authorization information as represented by block 303 (FIG. 3) and block 401 (FIG. 4) may also be performed pursuant to a "warm reset" (e.g., a reset such as that caused by assertion of an INIT pin on an Intel® x86 processor) as opposed to a cold reset (e.g., assertion of a RESET pin) as in FIG. 3. In a warm reset, there may be no initial powering-up of hardware. A process according to embodiments of the present invention corresponding to a warm reset is shown in FIG. 4A. Following a warm reset of a processing element as shown in block 450, as part of the execution of firmware according to embodiments of the present invention pursuant to a warm reset, the processing element may read the authorization information, as shown in block 451. The firmware could be, for example, firmware of the Intel® x86 processor architecture. If authorized, the processing element may proceed to complete its initialization, as shown in block 453. Otherwise, the processing element may enter an inactive state, as shown in block 452.

Following execution of the processes of FIGS. 3 and 4, a system including a processor package according to embodiments of the present invention may reach the state shown in block 200 of FIG. 2. The process of FIG. 4 may be further used to implement other operations shown in FIG. 2. More specifically, after a request for additional processing capacity (block 201, FIG. 2) and a corresponding update of the authorization information (block 202, FIG. 2) to authorize one or more of the reserve processing elements for use, a signal to become active (e.g., a SIPI) may be issued to a previously inactive processing element (e.g., a processing element in a Wait_for_SIPI state) as shown in block 400 and signal 404 (FIG. 4). The previously inactive processing element may then check the authorization information to determine if it is authorized to become active as shown in corresponding blocks 401 (FIG. 4) and 204 (FIG. 2). If it is authorized, the previously inactive processing element may become active, as shown in corresponding blocks 403 (FIG. 4) and 205 (FIG. 2).

Figure 5:
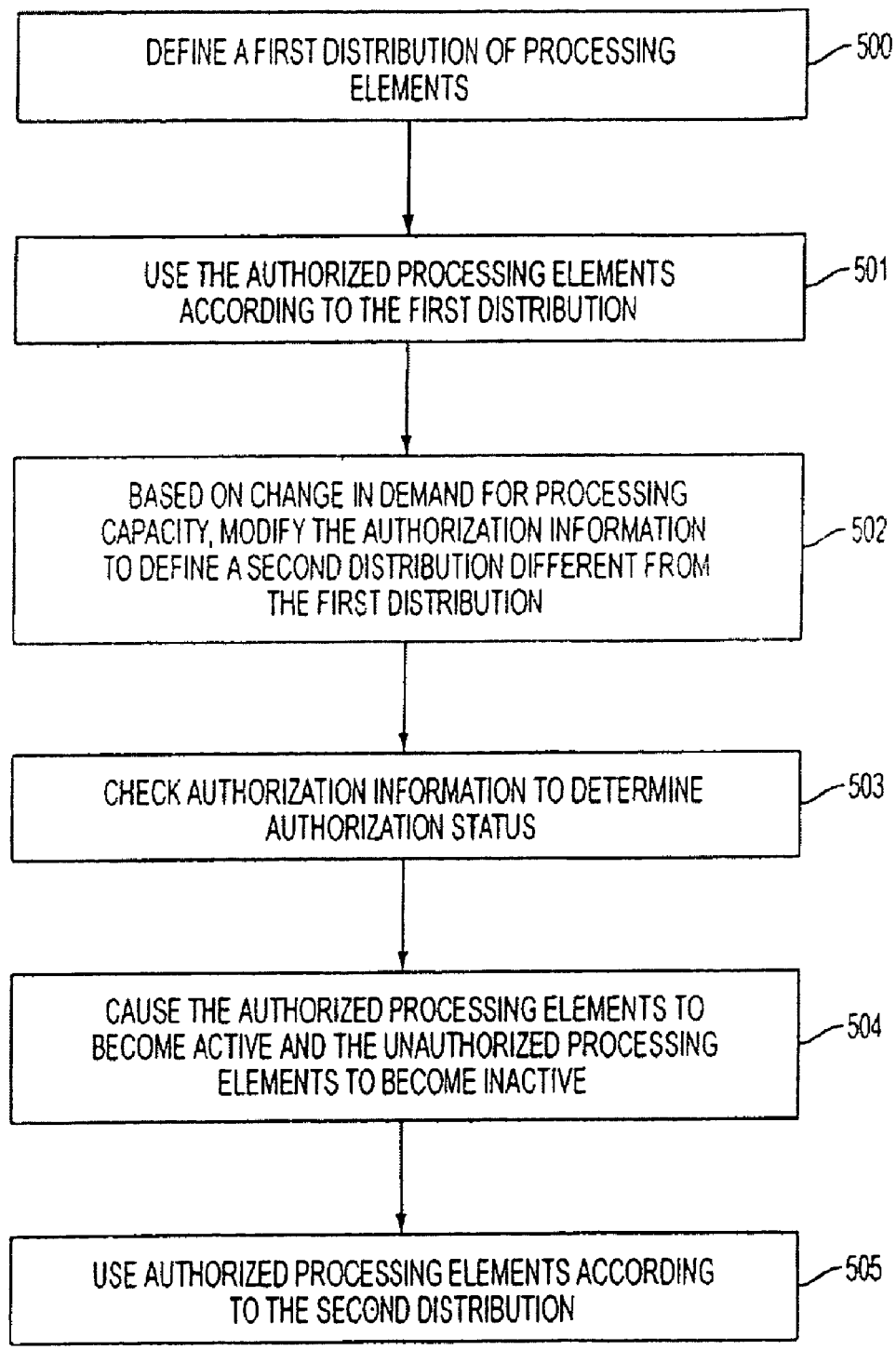

It should be understood that a processing element need not enter an inactive state only following a cold reset. A processing element could be placed into an inactive state after a period of activity, by causing the associated operating system and BIOS to no longer recognize the processing element as active or available. This could include placing the processing element in a Wait_for_SIPI state. Then, the authorization information could be correspondingly updated. Then, the processing element could be again made active, and again inactive, based on demand. Such a process is illustrated generally in FIG. 5. FIG. 5 shows operations that could occur on an "up-and-running" system as variations in the level of demand for processing capacity were experienced, and the authorization information was correspondingly modified. As shown in block 500, a first distribution of processing elements in a processor package may be defined in the authorization information, where the first distribution defines a set of processing elements authorized to be active and a set of processing elements not authorized to be active. As shown in block 501, the set of processing elements authorized to be active according to the first distribution may be used, while the unauthorized set remains inactive.

As shown in block 502, based on a change in demand for processing capacity, the authorization information may be modified to define a second distribution of the processing elements different from the first distribution. The second distribution may define more processing elements authorized to be active than does the first distribution. On the other hand, the second distribution may define fewer processing elements authorized to be active than does the first distribution. Pursuant to the modification of the authorization information, the authorization information may be checked by respective processing elements to determine their authorization statuses, as shown in block 503. Based on their respective authorization statuses, one or more processing elements may become active, or become inactive, as shown in block 504. As a result, the system may be used with the second distribution of processing elements, as shown in block 505.

As noted earlier, embodiments of the present invention may realize economies of implementation in that straightforward checks for authorization may be inserted in standard system firmware as described above. Other standard software also meshes well with operations according to embodiments of the invention. For example, block 203 (FIG. 2) could be preceded by standard firmware operations (not illustrated) associated with detecting a device newly added to system hardware and making the device recognized to an operating system. An example of a suitable firmware process of this kind is known in some systems as a "Processor Online Flow." A Processor Online Flow could include or culminate in a signal to a previously inactive reserve processing element to become active as shown in block 203. Along similar lines, "becoming active" as shown in block 205 could include notifying an operating system of the presence of a newly initialized processing element and bringing it online via industry standard ACPI (Advanced Configuration and Power Interface; Version 2.0c, Aug. 25, 2003 by Intel Corp. et al.) operations for interfacing between a BIOS (Basic Input/Output System) and an operating system.

Figure 6:
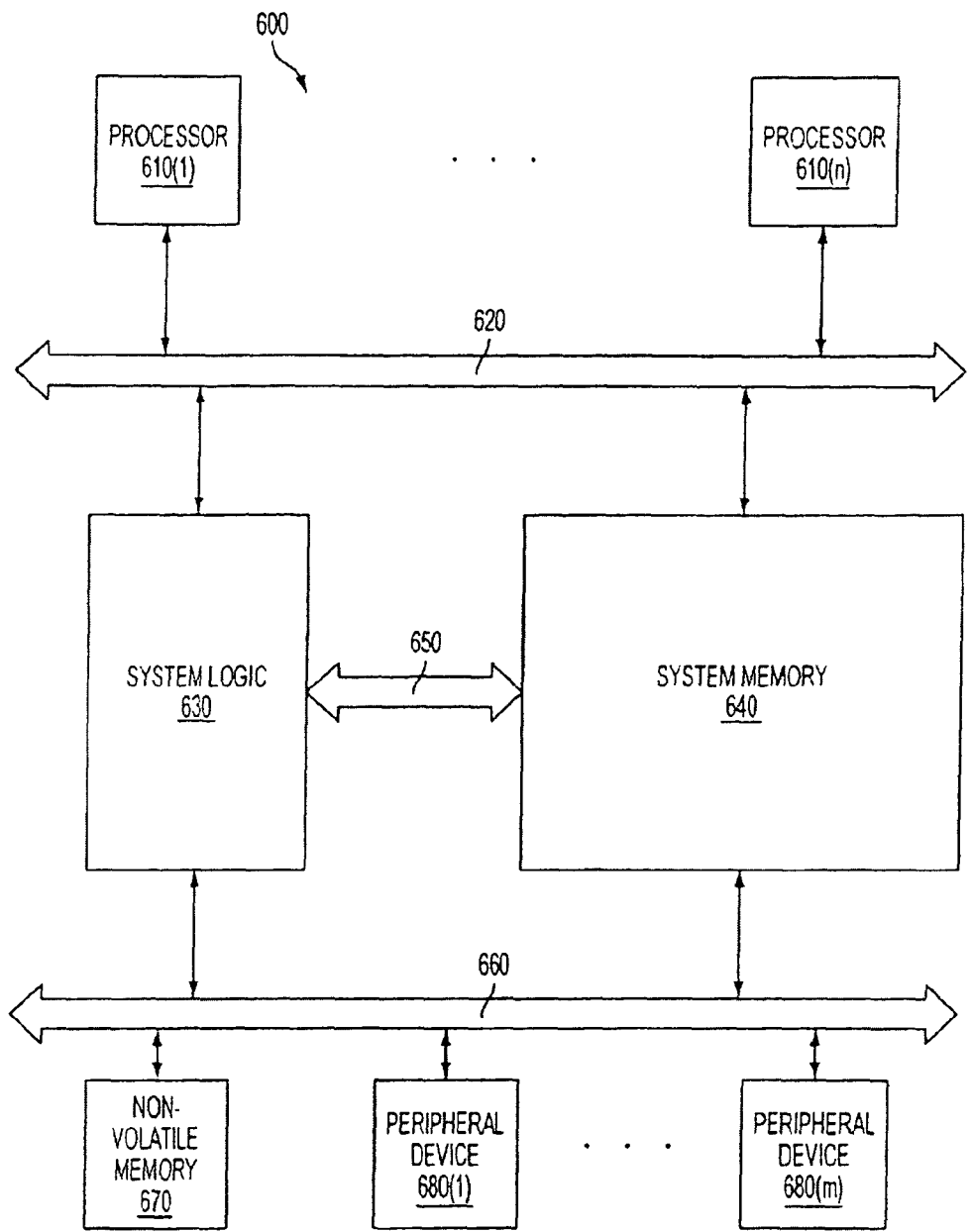
FIG. 6 shows a system according to embodiments of the present invention.

FIG. 6 is a block diagram of a computer system, which may include an architectural state, including one or more processor packages and memory for use in accordance with an embodiment of the present invention. In FIG. 6, a computer system 600 may include one or more processor packages 610(1)-610(n) coupled to a processor bus 620, which may be coupled to a system logic 630. Each of the one or more processor packages 610(1)-610(n) may be N-bit processor packages and may include a decoder (not shown) and one or more N-bit registers (not shown). System logic 630 may be coupled to a system memory 640 through a bus 650 and coupled to a non-volatile memory 670 and one or more peripheral devices 680(1)-680(m) through a peripheral bus 660. Peripheral bus 660 may represent, for example, one or more Peripheral Component Interconnect (PCI) buses, PCI Special Interest Group (SIG) PCI Local Bus Specification, Revision 2.2., published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 670 may be a static memory device such as a read only memory (ROM) or a flash memory. Peripheral devices 680(1)-680(m) may include, for example, a keyboard; a mouse or other pointing devices; mass storage devices such as hard disk drives, compact disc (CD) drives, optical disks, and digital video disc (DVD) drives; displays and the like.

Further, as noted earlier, micro-code for executing processes according to embodiments of the present invention could be stored on a machine-readable medium such as ROM. The micro-code could also be stored on readily portable machine-readable media such as magnetic tape, diskette, CD-ROM and the like.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method comprising:
using a processor package comprising at least one active processing element and at least one inactive processing element;
receiving a request for additional processing capacity;
based on the request, updating authorization information relating to which of processing elements on the processor package is authorized to become active and storing said updated authorization information in a register in a memory unit; wherein said authorization information is stored as a set of bits, each bit corresponding to a processing element and indicating an authorization status for the corresponding processing element;
checking the authorization information to determine whether the at least one inactive reserve processing element is authorized to become active; and
if the at least one inactive processing element is authorized to become active, causing it to become active, and if the at least one inactive processing element is not authorized to become active, causing it to remain inactive;
if a respective one of the other processing elements is authorized to become active, causing it to become active; and
if a respective one of the other processing elements is not authorized to become active, causing it to re-enter the inactive state.

2. The method of claim 1, further comprising:
based on a decrease in demand for processing capacity, again updating the authorization information; and
based on the updated authorization information, causing the active reserve processing element to again become inactive.

3. A method comprising:
defining a first distribution of processing elements in a processor package, the first distribution defining a set of processing elements authorized to be active and a set of processing elements not authorized to be active;
storing an authorization status for each processing element as a bit in a register in a shared memory;
using the set of processing elements authorized to be active according to the first distribution;

based on a change in demand for processing capacity, defining a second distribution of the processing elements different from the first distribution; and using the set of processing elements authorized to be active according to the second distribution.

4. The method of claim 3, wherein the second distribution defines more processing elements authorized to be active than does the first distribution.

5. The method of claim 3, wherein the second distribution defines fewer processing elements authorized to be active than does the first distribution.

6. A method comprising:

initializing a first processing element of a plurality of processing elements on a processor package;

causing others of the processing elements to enter an inactive state;

causing the first processing element to send a signal to each of the other processing elements to leave the inactive state and check authorization information to determine whether each is authorized to become active, wherein said authorization information is stored as a set of bits, each bit corresponding to a processing element and indicating an authorization status for the corresponding processing element;

if a respective one of the other processing elements is authorized to become active, causing it to become active; and if a respective one of the other processing elements is not authorized to become active, causing it to re-enter the inactive state.

7. The method of claim 6, further comprising causing the first processing element to check the authorization information to determine whether it is authorized to become active, and if it is not authorized to become active, causing it to enter an inactive state.

8. A machine-readable medium storing instructions to perform a process comprising:

initializing a first processing element of a plurality of processing elements on a processor package;

causing others of the processing elements to enter an inactive state;

causing the first processing element to send a signal to each of the other processing elements to leave the inactive state and check authorization information to determine whether each is authorized to become active, wherein said authorization information is stored as a set of bits, each bit corresponding to a processing element and indicating an authorization status for the corresponding processing element;

if a respective one of the other processing elements is authorized to become active, causing it to become active; and if a respective one of the other processing elements is not authorized to become active, causing it to re-enter the inactive state.

9. The machine-readable medium of claim 8, the process further comprising causing the first processing element to check the authorization information to determine whether it is authorized to become active, and if it is not authorized to become active, causing it to enter an inactive state.

\* \* \* \* \*